United States Patent
Smith et al.

(10) Patent No.: US 10,670,910 B2
(45) Date of Patent: Jun. 2, 2020

(54) LCD WITH FOUR STABLE AND OPTICALLY DISTINCT STATES

(71) Applicant: Sharp Kabushiki Kaisha, Osaka (JP)

(72) Inventors: Nathan James Smith, Oxford (GB); Andrew Acreman, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 16/139,396

(22) Filed: Sep. 24, 2018

(65) Prior Publication Data
US 2020/0096815 A1    Mar. 26, 2020

(51) Int. Cl.
  *G02F 1/1335*   (2006.01)
  *G02F 1/1337*   (2006.01)
  *G02F 1/1343*   (2006.01)

(52) U.S. Cl.
  CPC ...... *G02F 1/133528* (2013.01); *G02F 1/1337* (2013.01); *G02F 1/1343* (2013.01)

(58) Field of Classification Search
  None
  See application file for complete search history.

(56) References Cited

U.S. PATENT DOCUMENTS

| | | |
|---|---|---|
| 4,333,708 A | 6/1982 | Boyd et al. |
| 5,796,459 A | 8/1998 | Bryan-Brown et al. |
| 6,249,332 B1 * | 6/2001 | Bryan-Brown ..... G02F 1/13378 349/129 |
| 6,249,932 B1 | 6/2001 | Chu et al. |
| 6,903,790 B2 | 6/2005 | Kitson et al. |
| 9,280,018 B2 | 3/2016 | Mottram et al. |

* cited by examiner

*Primary Examiner* — James A Dudek
(74) *Attorney, Agent, or Firm* — Renner, Otto, Boisselle & Sklar, LLP

(57) ABSTRACT

A display device includes an optical stack arrangement including from the viewing side: a front polarizer; a first electrode layer; a viewing side bistable liquid crystal (LC) alignment layer; an LC layer; a non-viewing side bistable LC alignment layer; a second electrode layer; and a rear polarizer. The bistable LC alignment layers induce alignment of LC molecules of the LC layer adjacent to respective surfaces of the bistable LC alignment layers. The non-viewing side bistable LC alignment layer is switchable between two stable LC alignment states and the viewing side bistable LC alignment layer is also switchable between two stable LC alignment states. A combination of structural parameters of the viewing side and non-viewing side bistable LC alignment layers and the front and rear polarizers renders the display device operable to achieve four stable distinct optical states, each stable distinct optical state having a different optical response when viewed from the viewing side of the display device.

20 Claims, 13 Drawing Sheets

Fig. 7A

| Item | Item orientation, φ | Item orientation, θ |
|---|---|---|
| Front Polarizer (42) Transmission Axis | $\varphi_{P2}$ | N/A |
| Grating vector of second bistable LC alignment layer (44) | $\varphi_{G2}$ | N/A |
| LC alignment direction of second bistable LC alignment layer (44) | $\varphi_2 (=\varphi_{G2})$ | $\theta_{21}$ or $\theta_{22}$ |
| LC alignment direction of first bistable LC alignment layer (46) | $\varphi_1 (=\varphi_{G1})$ | $\theta_{11}$ or $\theta_{12}$ |
| Grating vector of first bistable LC alignment layer (46) | $\varphi_{G1}$ | N/A |
| Reflective Polarizer (50) Transmission Axis | $\varphi_{RP1}$ | N/A |
| Rear Polarizer (48) Transmission Axis | $\varphi_{P1}$ | N/A |

Fig. 7B

| Rule number | Structural Relationships |
|---|---|
| 1 | $\varphi_{G1} \neq \varphi_{G2}$ |
| 2 | $\varphi_{G1} - \varphi_{G2} \neq n*90°$ (n=integer) |
| 3 | $\varphi_{G1} \neq \varphi_{P1}$ |
| 4 | $\varphi_{G1} \neq \varphi_{P2}$ |
| 5 | $\varphi_{G2} \neq \varphi_{P1}$ |
| 6 | $\varphi_{G2} \neq \varphi_{P2}$ |

Fig. 8A

| Item | Item orientation, φ | Item orientation, θ |
|---|---|---|
| Front Polarizer (42) Transmission Axis | 90° | N/A |
| Grating vector of second bistable LC alignment layer (44) | 20°±10° | N/A |
| LC alignment direction of second bistable LC alignment layer (44) | 20°±10° | <15° or >75° |
| LC alignment direction of first bistable LC alignment layer (46) | 45°±10° | <15° or >75° |
| Grating vector of first bistable LC alignment layer (46) | 45°±10° | N/A |
| Reflective Polarizer (50) Transmission Axis | 90° | N/A |
| Rear Polarizer (48) transmission axis | 90° | N/A |

Fig. 8B

| Item | Item orientation, φ | Item orientation, θ |
|---|---|---|
| Front Polarizer (42) Transmission Axis | 0° | N/A |
| Grating vector of second bistable LC alignment layer (44) | 20°±10° | N/A |
| LC alignment direction of second bistable LC alignment layer (44) | 20°±10° | <15° or >75° |
| LC alignment direction of first bistable LC alignment layer (46) | 45°±10° | <15° or >75° |
| Grating vector of first bistable LC alignment layer (46) | 45°±10° | N/A |
| Reflective Polarizer (50) Transmission Axis | 90° | N/A |
| Rear Polarizer (48) transmission axis | 0° | N/A |

Fig. 8C

| Item | Item orientation, φ | Item orientation, θ |
|---|---|---|
| Front Polarizer (42) Transmission Axis | 90° | N/A |
| Grating vector of second bistable LC alignment layer (44) | 20° | N/A |
| LC alignment direction of second bistable LC alignment layer (44) | 20° | ~7° or ~90° |
| LC alignment direction of first bistable LC alignment layer (46) | 45° | ~7° or ~90° |
| Grating vector of first bistable LC alignment layer (46) | 45° | N/A |
| Reflective Polarizer (50) Transmission Axis | 90° | N/A |
| Rear Polarizer (48) Transmission Axis | 90° | N/A |

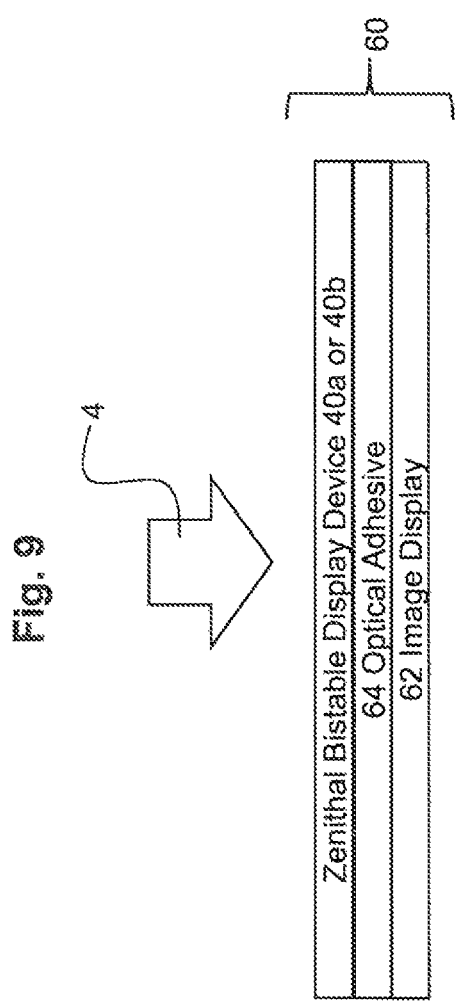

LCD WITH FOUR STABLE AND OPTICALLY DISTINCT STATES

TECHNICAL FIELD

The present invention relates to liquid crystal display devices, and more specifically to liquid crystal display devices that are switchable between configurations or states having different optical characteristics.

BACKGROUND ART

A conventional bistable liquid crystal display (LCD) has two stable liquid crystal (LC) configurations that can exist with no applied voltage. Switching between the two stable LC configurations is achieved via the application of a suitable voltage waveform, and the voltage waveform is not required to maintain either stable state but only to switch between the stable states. When combined with other optical components (e.g., polarizers), the two stable LC configurations have two optically distinct states. As used herein, "distinct optical states" means that the optical states correspond to light emissions that appear visually different to a viewer of the LCD. Because the voltage waveform is not required to maintain either stable state but only to switch between the stable states, no power is consumed in a stable LC configuration, and consequently bistable LCDs are attractive for their low power consumption. Bistable LCDs have been previously disclosed, for example, in U.S. Pat. No. 4,333,708 (Boyd et al., issued Jun. 8, 1982), U.S. Pat. No. 9,280,018 (Mottram et al., issue Mar. 8, 2016), U.S. Pat. No. 5,796,459 (Bryan-Brown et al., issued Aug. 18, 1998), and U.S. Pat. No. 6,903,790 (Kitson et al., issued Jun. 7, 2005).

Generally, a zenithal bistable alignment surface is an LC alignment surface that can adopt either a substantially vertically aligned state or a substantially horizontally aligned state with respect to the LC molecules at the alignment surface. LCDs described in U.S. Pat. No. 6,249,332 (Bryan-Brown et al., issued Jun. 19, 2001) have at least a first zenithally bistable alignment surface located on an opposite side of the LC layer from a monostable alignment surface (which can adopt only a single alignment state). In other embodiments, U.S. Pat. No. 6,249,332 also discloses an LCD that has two zenithally bistable alignment surfaces facing or opposing each other with the LC layer disposed between the two zenithally bistable alignment surfaces. An LCD with two zenithally bistable alignment surfaces may have four stable LC configurations that each can exist with no applied voltage, by virtue of the different combinations of the horizontal and vertical alignment states of the two zenithally bistable alignment surfaces. However, of the four stable LC configurations that may be achieved, two of the stable LC configurations are optically indistinguishable from each other owing to the arrangement of optical components described, i.e., two stable LC configurations appear identically to a viewer of the device, and thus are not optically distinct states. Consequently, in conventional configurations only three optically distinct LC states may be achieved using a configuration having two bistable alignment surfaces, because two of the stable states are optically identical rather than being optically distinct.

SUMMARY OF INVENTION

The present invention relates to a liquid crystal display device (LCD) that has four stable LC configurations, wherein each stable LC configuration corresponds to a distinct optical state of light emission that appears visually different to a viewer of the LCD. In exemplary embodiments, each stable LC configuration has a different luminance and/or color of light that is emitted from the viewing side of the LCD. Furthermore, the LCD may be combined with an additional image display that emits image light to the viewer.

The LCD includes a first zenithally bistable alignment surface on a first substrate, and an opposing second zenithally bistable alignment surface on a second substrate positioned on opposite sides of an LC layer. In other words, the first and second substrates are arranged so that the first zenithally bistable alignment surface is opposite to the second zenithally bistable alignment surface, with the LC layer being disposed between the opposing zenithally bistable alignment surfaces. The first zenithally bistable alignment surface is on a non-viewing side of the device and is orientated within a range of azimuthal angles relative to the second zenithally bistable alignment surface that is on a viewing side of the device in a manner that permits generation of four LC configurations having corresponding and respective four distinct optical states as the LC device appears to a viewer. A first linear polarizer is adhered to an outside surface of the first substrate relative to the first zenithally bistable alignment surface (i.e., a rear polarizer), and is orientated in a first direction. A second linear polarizer is adhered to an outside surface of the second substrate relative to the second zenithally bistable alignment surface (i.e., a front polarizer), and also is orientated in said first direction.

A suitable waveform voltage is applied across the LC material so that, in combination with the first and second zenithally bistable alignment surfaces, switching between four distinct and energetically stable LC configurations may be realized. Since the first zenithally bistable alignment surface is orientated within a specifically selected range of azimuthal angles relative to the second zenithally bistable alignment surface, each of the four distinct LC configurations has an optically distinct response to light that is transmitted through, and/or reflected from, the LCD. In this manner, four distinct optical states, i.e., states that appear differently to the viewer when the LCD is viewed from the viewing side, are achieved respectively for each of the four distinct LC configurations.

More specifically, the four distinct optical states are achievable with satisfaction of the following structural or design relationships of the two zenithally bistable alignment surfaces and the related additional optical components. The azimuthal orientation of the grating vector $\varphi_{G1}$ of the first and non-viewing side zenithally bistable alignment surface, and the azimuthal orientation of the grating vector $\varphi_{G2}$ of the second and viewing side zenithally bistable alignment surface, are different. A difference between the azimuthal orientation of the grating vectors $\varphi_{G1}$ and $\varphi_{G2}$ does not equal 90°. The azimuthal orientation of the grating vector $\varphi_{G1}$ and the azimuthal orientation of the first (rear) polarizer transmission axis $\varphi_{P1}$ are different. The azimuthal orientation of the grating vector $\varphi_{G1}$ and the azimuthal orientation of the second (front) polarizer transmission axis $\varphi_{P2}$ are different. The azimuthal orientation of the grating vector $\varphi_{G2}$ and the azimuthal orientation of the first (rear) polarizer transmission axis $\varphi_{P1}$ are different. The azimuthal orientation of the grating vector $\varphi_{G2}$ and the azimuthal orientation of the second (front) polarizer transmission axis $\varphi_{P2}$ are different.

By satisfying such structural relationships, as referenced above four distinct optical states are achievable in an LCD having two zenithally bistable alignment surfaces. The present invention, therefore, constitutes an improvement over conventional configurations having two zenithally bistable alignment surfaces, in which only three distinct optical states can be achieved.

An aspect of the invention, therefore, is a display device that has four stable LC configurations, wherein each stable LC configuration corresponds to a distinct optical state of light emission that appears visually different to a viewer of the LCD. The display device includes an optical stack arrangement including from the viewing side: a front polarizer; a first electrode layer; a viewing side bistable liquid crystal (LC) alignment layer; an LC layer; a non-viewing side bistable LC alignment layer; a second electrode layer; and a rear polarizer. The non-viewing side bistable LC alignment layer and the viewing side bistable LC alignment layer induce alignment of LC molecules of the LC layer adjacent to respective surfaces of the non-viewing side bistable LC alignment layer and the viewing side bistable LC alignment layer. The non-viewing side bistable LC alignment layer is switchable between two stable LC alignment states and the viewing side bistable LC alignment layer is also switchable between two stable LC alignment states. A combination of structural parameters of the viewing side and non-viewing side bistable LC alignment layers and the front and rear polarizers renders the display device operable to achieve four stable distinct optical states, each stable distinct optical state having a different optical response when viewed from the viewing side of the display device.

In exemplary embodiments, the combination of structural parameters of the viewing side and non-viewing side bistable LC alignment layers and the front and rear polarizers satisfies the following structural relationships:

1. the non-viewing side bistable LC alignment layer has a grating vector $\varphi_{G1}$ and the viewing side bistable LC alignment layer has a grating vector $\varphi_{G2}$, and an azimuthal orientation of the grating vectors $\varphi_{G1}$ and $\varphi_{G2}$ are different;
2. a difference between the azimuthal orientation of the grating vectors $\varphi_{G1}$ and $\varphi_{G2}$ does not equal n*90° where n is an integer;
3. the azimuthal orientation of the grating vector $\varphi_{G1}$ of the non-viewing side bistable LC alignment layer and an azimuthal orientation of the rear polarizer transmission axis $\varphi_{P1}$ are different;
4. the azimuthal orientation of the grating vector $\varphi_{G1}$ of the non-viewing side bistable LC alignment layer and an azimuthal orientation of the front polarizer transmission axis $\varphi_{P2}$ are different;
5. the azimuthal orientation of the grating vector $\varphi_{G2}$ of the viewing side bistable LC alignment layer and the azimuthal orientation of the rear polarizer transmission axis $\varphi_{P1}$ are different; and
6. the azimuthal orientation of the grating vector $\varphi_{G2}$ of the viewing side stable LC alignment layer and the azimuthal orientation of the front polarizer transmission axis $\varphi_{P2}$ are different.

In addition, the non-viewing side bistable LC alignment layer has a different switching threshold voltage from the viewing side bistable LC alignment layer to switch between the two stable alignment states.

Another aspect of the invention is a display system including an optical stack arrangement from a viewing side including the display device according to any of the embodiments, and an image display that emits image light toward a viewing side of the display system.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

FIG. 7A is a chart defining symbols relating to pertinent parameters associated with the various optical components of the LCD arrangement of the zenithal bistable display devices of FIGS. 5 and 6 in accordance in accordance with embodiments of the present invention.

FIG. 7B is a chart defining structural relationships among the pertinent parameters defined in FIG. 7A in accordance with embodiments of the present invention, to permit four distinct optical states.

FIG. 8A is a chart depicting an example embodiment including numerical values of the pertinent parameters that adhere to the structural relationships defined in FIG. 7B.

FIG. 8B is a chart depicting another example embodiment including numerical values of the pertinent parameters that adhere to the structural relationships defined in FIG. 7B.

FIG. 8C is a chart depicting another example embodiment including numerical values of the pertinent parameters that adhere to the structural relationships defined in FIG. 7B.

FIG. 9 is a schematic drawing depicting an exemplary display system including an image display combined with a zenithal bistable display device in accordance with embodiments of the present invention.

DESCRIPTION OF EMBODIMENTS

Figure 1:
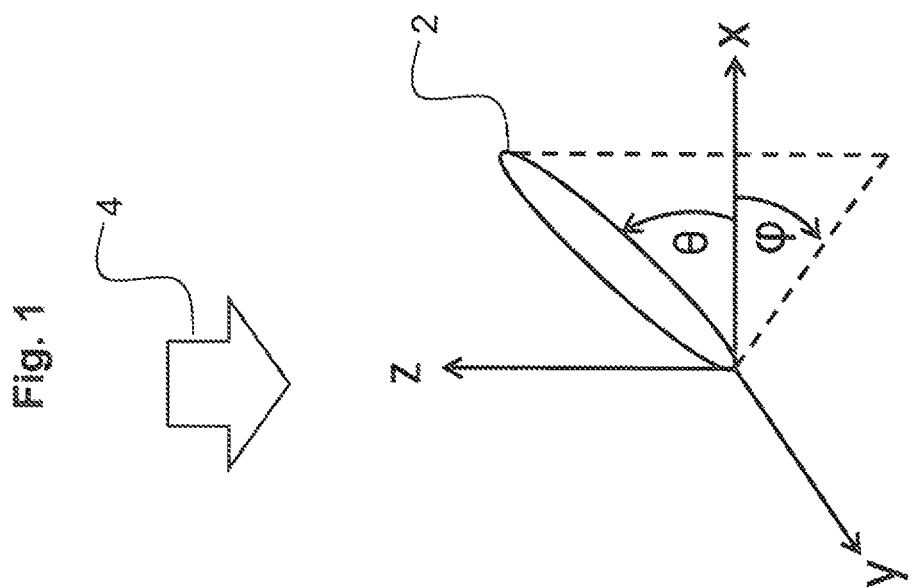
FIG. 1 defines a coordinate system for illustrating pertinent terms of orientation used in this disclosure.

Embodiments of the present invention will now be described with reference to the drawings, wherein like reference numerals are used to refer to like elements throughout. It will be understood that the figures are not necessarily to scale.

The present invention relates to a liquid crystal display device (LCD) that has four stable LC configurations, wherein each stable LC configuration corresponds to a respective distinct optical state of light emission that appears visually different to a viewer of the viewing side of the LCD. In exemplary embodiments, each stable LC configuration has a different luminance and/or color of light that is emitted from the LCD. The present invention, therefore, constitutes an improvement over conventional configurations having two zenithally bistable alignment surfaces, in which only three distinct optical states can be achieved. Furthermore, the LCD may be combined into a display system with an additional image display that emits image light to a viewer.

Figure 2:
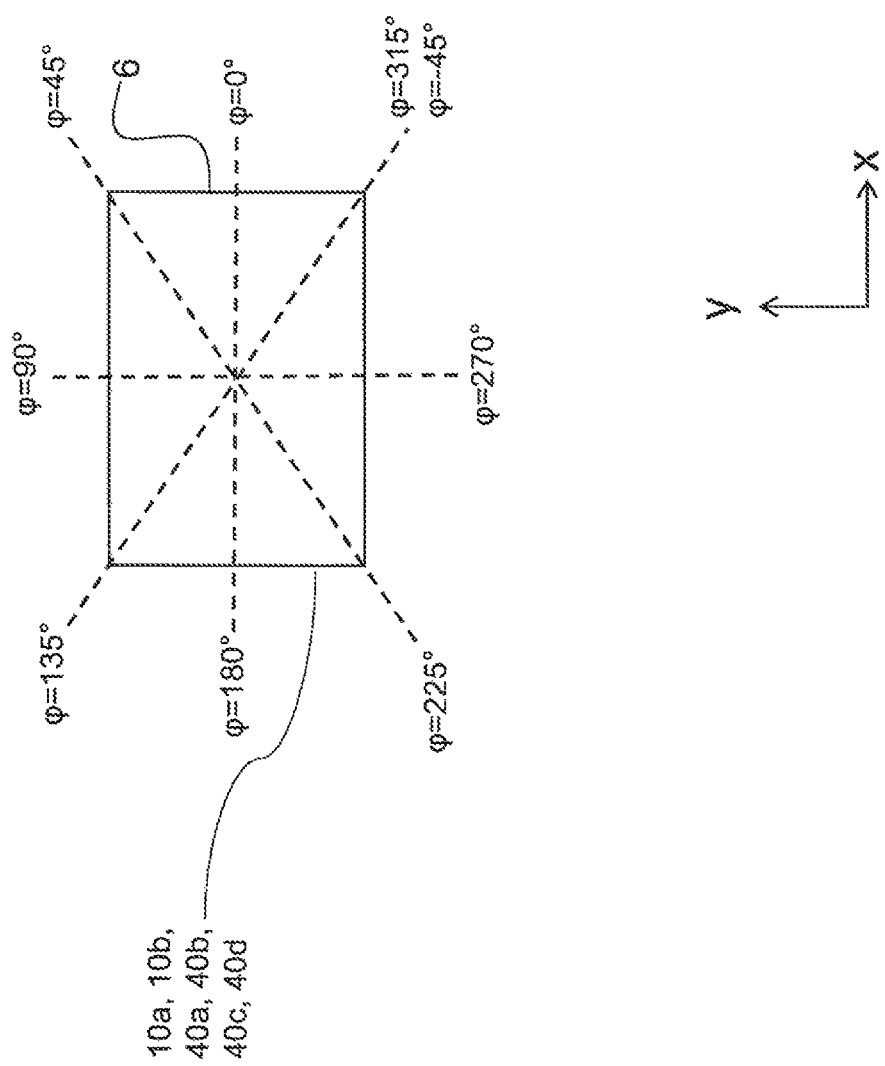
FIG. 2 defines a coordinate system pertaining to the in-plane angle $\varphi$ identified in FIG. 1.

For illustrative purposes, FIG. 1 defines a coordinate system for illustrating pertinent terms of orientation used in this disclosure. The axes x, y and z are orthogonal to each other. The angle between the x-axis and the y-axis is defined as the in-plane angle φ, with the term in-plane more particularly referring to being parallel to the plane of an LCD device. The angle between the x-axis (or y-axis) and the z-axis is the out-of-plane angle θ relative to the plane of an LCD device. For reference, an illustrative LC molecule 2 is depicted as may be oriented within an LC layer, and a viewing direction 4 of viewer along the z-axis, are shown. FIG. 2 defines a related coordinate system pertaining to the in-plane angle φ identified in FIG. 1. In particular, FIG. 2 shows a range of positioning of the in-plane angle φ with respect to an LCD device from the perspective of a viewing position relative to a generalized LCD device 6.

Figure 3:
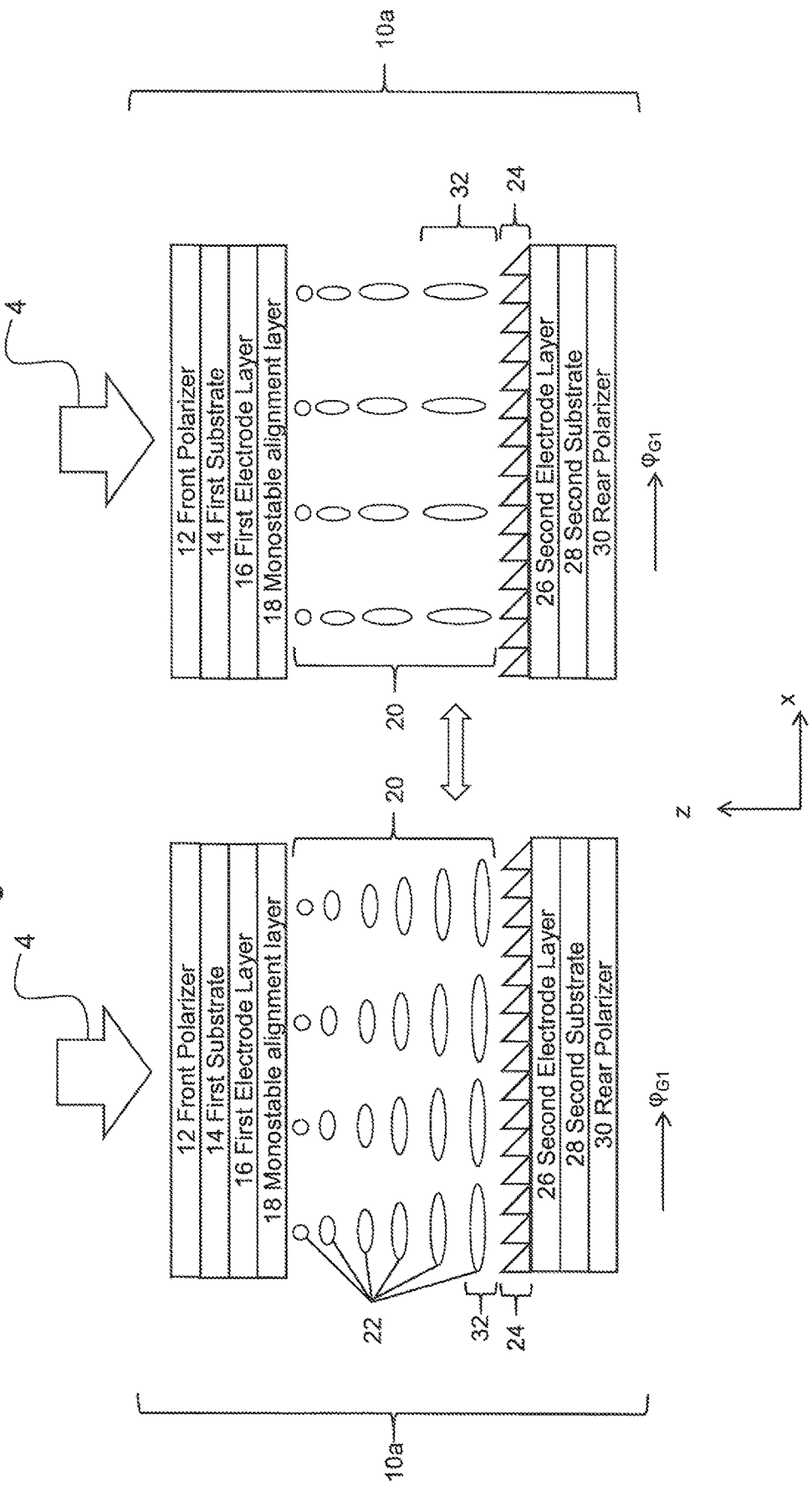
FIG. 3 is a schematic drawing depicting an LCD optical stack arrangement of a conventional zenithal bistable display device.

FIG. 3 is a schematic drawing depicting an LCD optical stack arrangement of a conventional zenithal bistable display device 10a. The conventional zenithal bistable display device 10a is shown with the viewing direction 4 identified to provide a directional viewpoint for the layers that form the optical stack of the zenithal bistable display device 10a. From the viewing side, the conventional zenithal bistable display device 10a includes a front polarizer 12, a first substrate 14, a first electrode layer 16, a monostable LC alignment layer 18, an LC layer 20 including individual LC molecules 22, a bistable alignment layer 24 with a grating structure having an associated grating vector (psi, a second electrode layer 26, a second substrate 28, and a rear polarizer 30. The positions of the monostable LC alignment layer 18 and the bistable LC alignment layer 24 may be interchanged. The bistable alignment layer 24 with the grating vector $\varphi_{G1}$ is operable to align the LC molecules 22 in two different orientations in a region 32 adjacent to the surface of the bistable alignment layer 24, as further detailed below.

The monostable LC alignment layer 18 has a preset alignment effect that cannot be switched. In this particular example, the monostable LC alignment layer 18 is a planar LC alignment layer that aligns the LC molecules 22 in substantially the y-direction (into the plane of the page). As understood by those skilled in the art of LCs, the monostable LC alignment layer 18 may have a pretilt angle of less than 15°, and therefore the LC molecule orientation in terms of the angle (θ, φ) may be in the range (0°,90°) to (15°, 90°). To simplify discussion, it is assumed for purposes of illustration that the monostable planar pretilt angle is 0° (i.e. θ=0°). The bistable alignment layer 24 can align the LC molecules in a region 32 adjacent to the surface of the bistable alignment layer 24. As shown in the left portion of FIG. 3, the first bistable alignment direction in the region 32 is a planar LC orientation whereby the LC molecules are aligned substantially in the x-direction. As understood by those skilled in the art of LCs, the first bistable LC alignment direction may have a pretilt angle of less than 15°, and therefore the LC orientation in terms of (θ, φ) may be in the range (0°, 0°) to (15°, 0°). To simplify discussion, it is assumed for purposes of illustration that the bistable planar pretilt angle is 0° (i.e. θ=0°). As shown in the right portion of FIG. 3, the second bistable alignment direction is a vertical LC orientation whereby the LC molecules are aligned substantially in the z-direction. As understood by those skilled in the art of LCs, the second bistable LC alignment direction may have a pretilt angle of between 75° and 90°, and therefore the LC orientation in terms of (θ, φ) may be in the range (75°, 0°) to (90°, 0°). To simplify discussion, it is assumed for purposes of illustration that the bistable vertical pretilt angle is 90° (i.e. θ=90°).

Switching between the bistable planar LC alignment (FIG. 3, left portion) and the bistable vertical LC alignment (FIG. 3, right portion) is achieved via application of a known voltage waveform to the electrode layers 16 and 26. Once selected, either the bistable planar LC alignment state or the bistable vertical LC alignment state persists after the removal of the voltage, i.e., the surface region 32 has two different stable LC alignment directions. Therefore, a combination of the monostable alignment layer 18 and a single opposing bistable alignment layer 24 enables two distinct stable LC configurations. The first stable LC configuration as shown in the left portion of FIG. 3 is a 90° twisted LC structure. The second stable LC configuration as shown in the right portion of FIG. 3 is a hybrid aligned LC structure with LC deformation in the y-z plane only.

The transmission axis of the rear polarizer 30 is either parallel to, or perpendicular to, the bistable planar alignment direction. The transmission axis of the front polarizer 12 is orthogonal to the transmission axis of the rear polarizer 30. The rear polarizer 30 may comprise a polarizer and a combined reflective polarizer so that the zenithal bistable display device 10a may operate in a reflective mode, by which ambient light may be reflected to be viewed by the viewer. The bistable alignment layer 24 has a grating type structure with physical grooves. The grating grooves are aligned substantially in the y-direction. The grating vector associated with the bistable alignment layer 24 is perpendicular to the groove direction and parallel to the bistable planar LC alignment direction. In other words, with reference to FIG. 3, the grating vector $\varphi_{G1}$ is in the x direction as identified in the figure.

Figure 4:
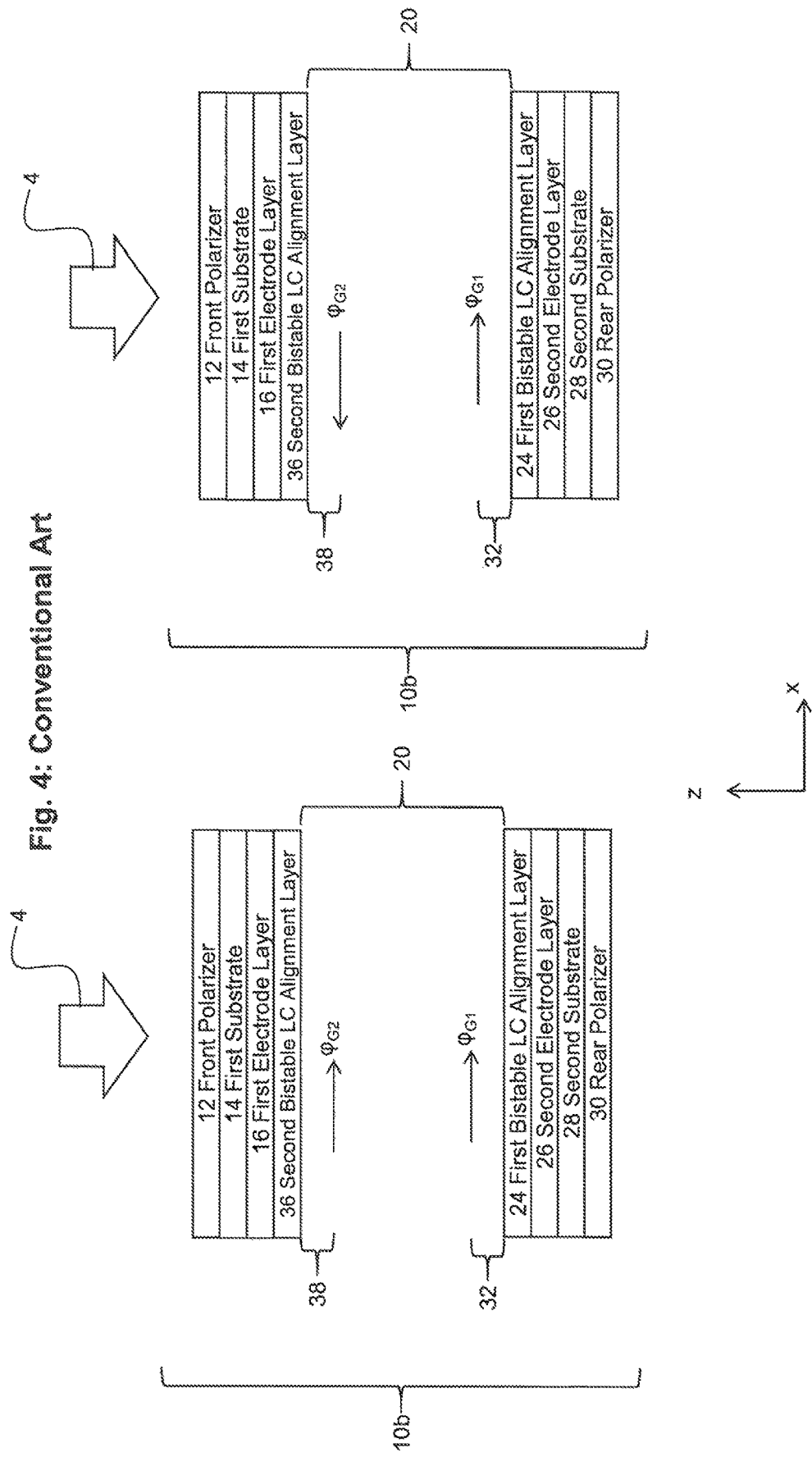
FIG. 4 is a schematic drawing depicting another LCD optical stack arrangement of a conventional zenithal bistable display device.

FIG. 4 is a schematic drawing depicting another LCD optical stack arrangement of a conventional zenithal bistable display device 10b. The device 10b has many comparable features as the device 10a of FIG. 3, and accordingly like components are identified with like reference numerals. Principally, in the structural arrangement of FIG. 4, the monostable LC alignment layer 18 has been replaced with a second bistable LC alignment layer 36 with a grating structure having an associated grating vector $\varphi_{G2}$. With reference to U.S. Pat. No. 6,249,332 referenced above, which exemplifies this type of device, the grating vector $\varphi_{G1}$ of the first bistable LC alignment layer 24 is either parallel to the grating vector $\varphi_{G2}$ of the second bistable LC alignment layer 36 (i.e. $\varphi_{G1}=\varphi_{G2}$) as shown in the left portion of FIG. 4, or anti-parallel to the grating vector $\varphi_{G2}$ of the second bistable LC alignment layer 36 (i.e. $\varphi_{G1}=-\varphi_{G2}$) as shown in the right portion of FIG. 4. The second bistable alignment layer 36 with the grating vector $\varphi_{G2}$ is operable to align the LC molecules in two different orientations in a region 38 adjacent to the surface of the second bistable alignment layer 36.

The use of two bistable LC alignment layers enables four stable LC configurations by a combination of alignments by the two bistable LC alignment layers 24 and 36 in the respective LC regions 32 and 38. A first LC configuration is a planar, non-twisted LC structure with a planar LC alignment induced by the first bistable LC alignment layer 24 and a planar LC alignment induced by the second bistable LC alignment layer 36. A second LC configuration is a hybrid aligned LC structure with a vertical LC alignment induced by the first bistable LC alignment layer 24 and a planar LC alignment induced by the second bistable LC alignment layer 36. A third LC configuration is another hybrid aligned LC structure with a planar LC alignment induced by the first bistable LC alignment layer 24 and a vertical LC alignment induced by the second bistable LC alignment layer 36 (basically the reverse of the second configuration). A fourth LC configuration is a vertically aligned LC structure with a vertical LC alignment induced by the first bistable LC alignment layer 24 and a vertical LC alignment induced by the second bistable LC alignment layer 36.

Although four different stable LC configurations may be achieved using the configuration of two bistable LC alignment layers 24 and 36, in actuality in the conventional configuration of FIG. 4, only three distinct optical states are achieved as viewed by a viewer. The limitation of three distinct optical states of conventional configurations results because the optical response of the second LC configuration and the third LC configuration (i.e., the two hybrid aligned states) are optically identical for an on-axis viewer. The present invention improves over the conventional configuration by selecting a combination of structural parameters of the two bistable LC alignment layers and the associated polarizers to achieve a fourth distinct optical state, i.e., the two hybrid aligned states have different optical responses for an on-axis viewer.

Figure 5:
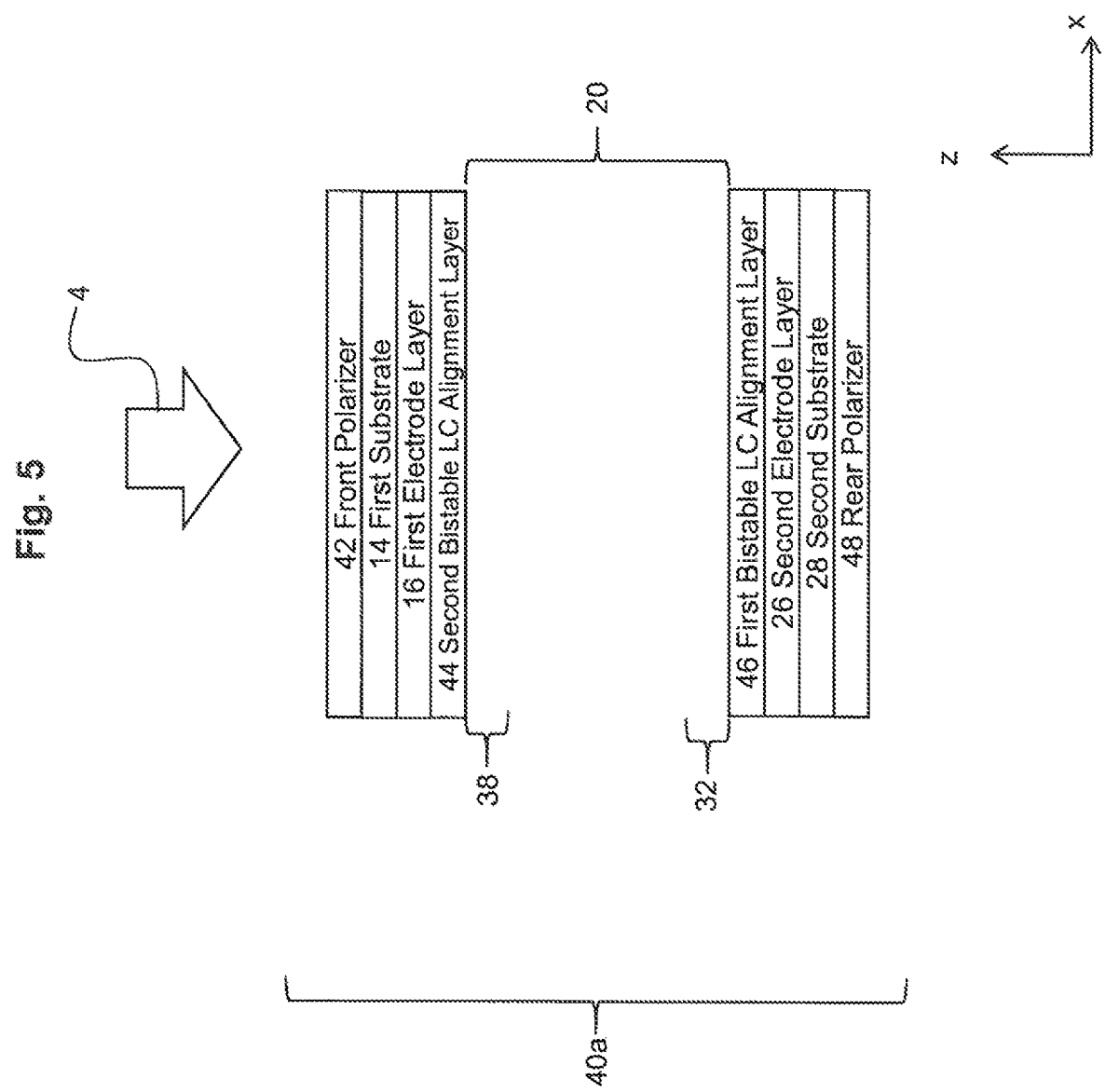
FIG. 5 is a schematic drawing depicting an exemplary LCD optical stack arrangement of a zenithal bistable display device in accordance with embodiments of the present invention.

FIG. 5 is a schematic drawing depicting an exemplary LCD optical stack arrangement of a zenithal bistable display device 40a in accordance with embodiments of the present invention. The configuration of FIG. 5 has common components relative to the conventional configurations, and thus like components are identified with like reference numerals. From the viewing side, the zenithal bistable display device 40a includes a front polarizer 42, a first substrate 14, a first electrode layer electrode 16, a second (viewing side) bistable LC alignment layer 44 with a grating structure having an associated grating vector $\varphi_{G2}$, the LC layer 20 including the individual LC molecules 22, a first (non-viewing side) bistable alignment layer 46 with a grating structure having an associated grating vector $\varphi_{G1}$, a second electrode layer 26, a second substrate 28, and a rear polarizer 48.

In comparing the structure of FIG. 5 to the conventional structure of FIG. 4, there is an overall similarity in the configuration of the layer stack. As referenced above, however, the present invention is characterized in that a combination of structural parameters of the two bistable LC alignment layers and the associated polarizers is selected to achieve a fourth distinct optical state (so these components are identified with different reference numerals), which is not achievable in the conventional configuration. More particularly, the azimuthal orientation ($\varphi$) of the components comprising the zenithal bistable display device 40a are different from the azimuthal orientation ($\varphi$) of the components comprising the conventional zenithal bistable display device 10b. The novel azimuthal orientation of components enables the zenithal bistable display device 40a to have the four distinct optical states as viewed by viewer from the viewing side of the display device, which is an advantage over the conventional zenithal bistable display device 10b that only has three distinct optical states. In exemplary embodiments, the four distinct different optical states each has a unique luminance and/or color. Switching between the four stable LC configurations may be achieved when the first bistable LC alignment layer 46 (non-viewing side) has a different switching threshold voltage from the second bistable LC alignment layer 44 (viewing side). Accordingly, a combination of structural parameters of the viewing side and non-viewing side bistable LC alignment layers and the front and rear polarizers renders the display device operable to achieve four stable distinct optical states, each stable distinct optical state having a different optical response when viewed from the viewing side of the display device.

Figure 6:
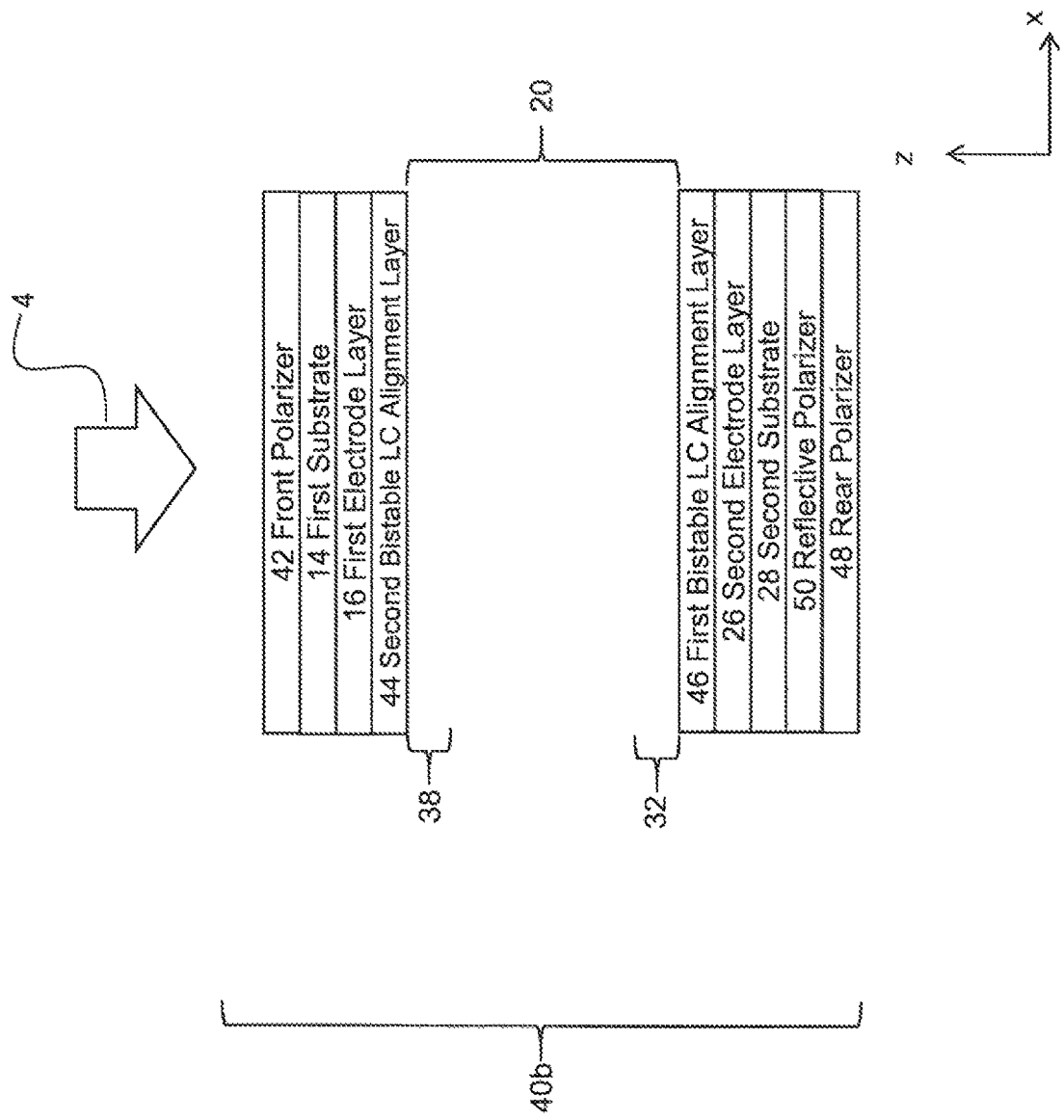
FIG. 6 is a schematic drawing depicting another exemplary LCD optical stack arrangement of a zenithal bistable display device in accordance with embodiments of the present invention.

FIG. 6 is a schematic drawing depicting another exemplary LCD optical stack arrangement of a zenithal bistable display device 40b in accordance with embodiments of the present invention. The configuration of FIG. 6 has common components relative to the configuration of FIG. 5, and thus like components are identified with like reference numerals. The configuration of FIG. 6 additionally incorporates a reflective polarizer 50 that is positioned between the second substrate 28 and the rear polarizer 48. The reflective polarizer 50 may be a dual brightness enhancement film (DBEF) of a known type that transmits light that is linearly polarized in a first azimuthal orientation while reflecting light that is linearly polarized in a second direction that is perpendicular to the first direction. A transmission axis of the reflective polarizer further is parallel to a transmission axis of the rear polarizer. The presence of the reflective polarizer 50 enables the zenithal bistable display device 40b to operate in a reflective mode, by which ambient light may be reflected to be viewed by the viewer.

Similarly as the embodiment of FIG. 5, in FIG. 6 the azimuthal orientation of components enables the zenithal bistable display device 40b to have four distinct optical states (as opposed to the conventional three distinct optical states), and each such state may have a unique luminance and/or color. Again, switching between the four stable LC configurations may be achieved when the first bistable LC alignment layer 46 has a different switching threshold voltage from the second bistable LC alignment layer 44. The reflected light may be emitted to the viewer in accordance with any of the four distinct optical states as dictated by the alignment states induced by the two bistable alignment layers.

As understood by those skilled in the art, the retardation of an LC layer is $\Delta n \ast d$, where $\Delta n$ is the birefringence of the LC material and d is the thickness of the LC layer. With reference to FIGS. 5 and 6, the retardation of the LC layer 20 may be in the range of 200 nm to 3200 nm, or more particularly within a range of 500 nm to 1100 nm. The thickness of the LC layer may be in the range 1 µm to 25 µm or more particularly within a range of 2 µm to 8 µm.

The electrode layers 16 and 26 of the zenithal bistable display devices 40a and 40b may be patterned so that pixels are formed. The pixels may be driven (i.e. switched) via a passive addressing scheme, or the pixels may be driven via a direct drive addressing scheme, as are known in the art. In addition to electrical switching between the four distinct stable optical states, additional unique optical states (i.e. additional unique LC states) may be achieved via the application of voltages across the LC layer 20 that are below the switching threshold voltage of the bistable LC alignment layers 44 and 46. However, these additional distinct optical states are not stable in that they do not persist when the voltage is removed, i.e. these states are non-stable. Each of these additional non-stable optical states also may have a unique luminance and/or color, which may be a function of the applied voltage. The luminance and/or color of all optical states (stable and non-stable) may be predetermined via the selection of a suitable retardation value for the LC layer 20 (i.e. the selection of a suitable combination LC birefringence and LC layer thickness) and selection of suitable values for $\varphi_{G1}$, $\varphi_{G2}$, $\varphi_{P1}$, and $\varphi_{P2}$, which are described below.

As referenced above, the present invention is characterized in that a combination of structural parameters of the two bistable LC alignment layers and the associated polarizers is selected to achieve the four distinct optical states. For illustrative purposes, therefore, FIG. 7A is a chart defining symbols relating to pertinent parameters associated with the various optical components of the LCD arrangement of the zenithal bistable display devices of FIGS. 5 and 6 in accordance with embodiments of the present invention. In particular, FIG. 7A defines the azimuthal orientations of components associated with zenithal bistable display devices 40a and 40b. The azimuthal orientation of the transmission axis of the rear polarizer 48 is $\varphi_{P1}$. The azimuthal orientation of the transmission axis of reflective polarizer 50 is $\varphi_{RP1}$. The transmission axis of the rear polarizer 48 is parallel to the transmission axis of the reflective polarizer 50. The LC alignment direction induced by the first bistable LC alignment layer 46 (non-viewing side) is either $(\theta_{11}, \varphi_1)$ or $(\theta_{12}, \varphi_1)$. The LC alignment direction induced by the second bistable LC alignment layer 44 (viewing side) is either $(\theta_{21}, \varphi_2)$ or $(\theta_{22}, \varphi_2)$. The grating vector of the first bistable LC alignment layer 46 is $\varphi_{G1}$, and the grating vector of the second bistable LC alignment layer 44 is $\varphi_{G2}$. The azimuthal orientation of the transmission axis of the front polarizer 42 is $\varphi_{P2}$.

With the pertinent parameters as defined above, FIG. 7B is a chart defining structural or design relationships among the pertinent parameters defined in FIG. 7A in accordance with embodiments of the present invention, to permit achieving the four distinct optical states. Accordingly, a combination of structural parameters of the viewing side and non-viewing side bistable LC alignment layers and the front and rear polarizers renders the display device operable to achieve the four stable distinct optical states by satisfying the structural relationships set forth in FIG. 7B, which results in each stable distinct optical state having a different optical response when viewed from the viewing side of the display device. The structural or design relationships to achieve the four distinct optical states are as follows:

1. $\varphi_{G1} \neq \varphi_{G2}$: The azimuthal orientation of the grating vectors $\varphi_{G1}$ and $\varphi_{G2}$ are different. In other words, when both the first and second bistable LC alignment layers 46 and 44 induce planar LC alignment, then the azimuthal orientation of the planar LC alignment direction induced by the first bistable LC alignment layer 46 (non-viewing side) is different from the azimuthal orientation of the planar LC alignment direction induced by the second bistable LC alignment layer 44 (viewing side).
2. $\varphi_{G1} - \varphi_{G2} \neq n*90°$: The difference between the azimuthal orientation of the grating vectors $\varphi_{G1}$ and $\varphi_{G2}$ does not equal n*90° where n is an integer.
3. $\varphi_{G1} \neq \varphi_{P1}$: The azimuthal orientation of the grating vector $\varphi_{G1}$ of the first bistable alignment layer (non-viewing side) 46 and the azimuthal orientation of the rear polarizer 48 transmission axis $\varphi_{P1}$ are different.
4. $\varphi_{G1} \neq \varphi_{P2}$: The azimuthal orientation of the grating vector $\varphi_{G1}$ of the first bistable alignment layer (non-viewing side) 46 and the azimuthal orientation of the front polarizer 42 transmission axis $\varphi_{P2}$ are different.
5. $\varphi_{G2} \neq \varphi_{P1}$: The azimuthal orientation of the grating vector $\varphi_{G2}$ of the second bistable alignment layer (viewing side) 44 and the azimuthal orientation of the rear polarizer 48 transmission axis $\varphi_{P1}$ are different.
6. $\varphi_{G2} \neq \varphi_{P2}$: The azimuthal orientation of the grating vector $\varphi_{G2}$ of the second bistable alignment layer (viewing side) 44 and the azimuthal orientation of the front polarizer 42 transmission axis $\varphi_{P2}$ are different.

When the above structural relationships are satisfied, four stable LC configurations of the zenithal bistable display devices 40a and 40b are enabled. The four stable LC configurations include:

1. A twisted LC state wherein the total twist angle of the LC layer does not equal 90°. This is achieved when the first and second bistable alignment layers both induce a planar LC alignment.
2. A first hybrid aligned LC state. This is achieved when the first bistable alignment layer 46 induces a vertical LC alignment and the second bistable alignment layer 44 induces planar LC alignment.
3. A second hybrid aligned LC state. This is achieved when the first bistable alignment layer 46 induces a planar LC alignment and the second bistable alignment layer 44 induces a vertical LC alignment.
4. A vertically aligned LC state. This is achieved when the first and second bistable alignment layers both induce a vertical LC alignment.

As referenced above, each of the four stable LC configurations corresponds to a distinct optical state as would be perceived by a viewer from the viewing side of the display device. Each of these four stable optical states may have a unique luminance and/or color, and the luminance and/or color of the optical states may be predetermined via the selection of the retardation value for the LC layer 20 (i.e. the selection of a suitable combination LC birefringence and LC layer thickness) and selection of suitable values for $\varphi_{G1}$, $\varphi_{G2}$, $\varphi_{P1}$, and $\varphi_{P2}$.

FIG. 8A is a chart depicting an example embodiment including numerical values of the pertinent parameters that adhere to the structural relationships defined in FIG. 7B. FIG. 8B is a chart depicting another example embodiment including numerical values of the pertinent parameters that adhere to the structural relationships defined in FIG. 7B. FIG. 8C is a chart depicting another example embodiment including numerical values of the pertinent parameters that adhere to the structural relationships defined in FIG. 7B, with more specific exemplary values being identified as compared to the range values of some of the parameters in FIG. 8A and FIG. 8B. As detailed above, the LC alignment direction on the first bistable LC alignment layer 46 (non-viewing side) may be switched between a planar value ($\theta < 15°$) and a vertical value ($\partial 4 > 75°$). In addition, the LC alignment direction on the second bistable LC alignment layer 44 (viewing side) may be switched between a planar value ($\theta < 15°$) and a vertical value ($\theta > 75°$). In a more general sense, the values of the structural parameters as denoted in FIGS. 8A, 8B and 8C comport with the structural relationships as forth in FIG. 7B to achieve the four LC configurations respectively corresponding to four distinct optical states as viewed by a viewer.

As referenced above, the electrode layers 16 and 26 of the zenithal bistable display devices 40a and 40b may be patterned so that pixels are formed. The pixels may be driven (i.e. switched) via a passive addressing scheme, or the pixels may be driven via a direct drive addressing scheme. For example, in an exemplary usage the zenithal bistable display devices 40a and 40b can be used for selective light emission (transmission—40a, or, transmission and/or reflection—40b) to a viewer. With pixilation of the device 40a and 40b, each pixel can be selectively addressed to be driven by a driving voltage waveform to achieve any one of the four stable distinct optical states, which is maintained when the driving voltage is removed for minimal power consumption. Accordingly, when the display device is pixelated, each pixel of the display device is selectively addressable to be switched to any of the four stable distinct optical states. For example, when each distinct optical state has a unique luminance and/or color, each pixel may be selectively addressed to be driven to achieve one of such four luminance-color states, and also switched among the four stable distinct optical states. The different pixels as selectively driven then can be combined into color patterns, which can correspond to designs, simple images, messages, and the like.

If a direct drive addressing scheme of the pixels is employed, typical resolutions of the display device 40a/40b may be between about 1000 and 100,000 pixels, which is low resolution as compared to high definition displays commonly used as image displays in computing devices, and portable computing devices (e.g., mobile phones, tablet computers) in particular. The zenithal bistable display devices 40a and 40b can be combined with a high-resolution image display to provide a visually pleasing device output when the image display is not being used. Uses may include, for example, screen savers, off-mode display outputs, and like display outputs otherwise under circumstances in which the image display would simply be a black screen (image display off). Such operation can provide a more pleasing device appearance and/or convey basic information when the high-resolution image display is not being used, with minimal power consumption as the stable optical states are maintained when the driving voltages are removed. Furthermore, as referenced above, powered states may be employed for additional optical states (although such states are not stable and would not persist after the driving voltage is removed).

In accordance with such exemplary usage, FIG. 9 is a schematic drawing depicting an exemplary display system 60 including an image display 62 combined with a zenithal bistable display device 40a or 40b in accordance with any of the embodiments of the present invention. The zenithal bistable display device 40a/40b may be adhered to the image display 62 using an optical adhesive 64 that is transmissive to light. The image display 62 may be a high-resolution display that is capable of showing detailed images, and may be an LCD display, organic light emitting diode (OLED) display, quantum dot light-emitting diode (QLED) display, micro-LED display, or any other suitable display device. When the image display 62 contains a polarizer on the viewing side of the image display 62 that effectively would perform the same function as the rear polarizer 48 of the zenithal bistable display device 40a or 40b, then the rear polarizer 48 may be removed from the display system 60 to reduce cost and reduce thickness, as the rear polarizer 48 effectively is incorporated as part of the image display 62. When the rear polarizer 48 effectively is incorporated as part of the image display 62, then the structural or design relationships described above governing the azimuthal orientation of rear polarizer 48 apply to the viewing side polarizer of the image display 62.

The azimuthal orientation of the polarizer on the viewing side of the image display 62 may be significant to the optimum performance of the image display 62. Therefore, changing the azimuthal orientation of the polarizer on the viewing side of the image display 62 to satisfy the structural relationships shown in FIG. 7B may be undesirable if this action compromises the image quality of the image display 62. Consequently, it may be advantageous that the azimuthal orientations of the first bistable grating vector (psi, the second bistable grating vector $\varphi_{G2}$ and the front polariser $\varphi_{P2}$ are selected so that the structural relationships shown in FIG. 7B are satisfied. In other words, optimum design of the display system 60 may be achieved by treating the azimuthal orientation of the polarizer on the viewing side of the image display 62 as a constant and treating the parameters $\varphi_{G1}$, $\varphi_{G2}$ and $\varphi_{P2}$ as variables that are adjusted to satisfy the structural relationships shown in FIG. 7B.

The image display 62 may be controlled as is conventional to display an image, while the zenithal bistable display device 40a/40b is switched into any of the four stable LC configurations to achieve a desired overall display output. The zenithal bistable display device 40a/40b may be addressed when the image display 62 is turned off. Optimal viewing of the image display 62 may be achieved when the first bistable LC alignment layer 46 induces a vertical LC alignment and the second bistable LC alignment 44 induces a vertical LC alignment (i.e., a VAN state with both bistable LC alignment layers inducing a vertical alignment). In the VAN state, the image light from the image display 62 would pass through to the viewer essentially without being affected by the zenithal bistable display device 40a/40b enabling the image display 62 to be viewed in a conventional manner.

Figure 10:
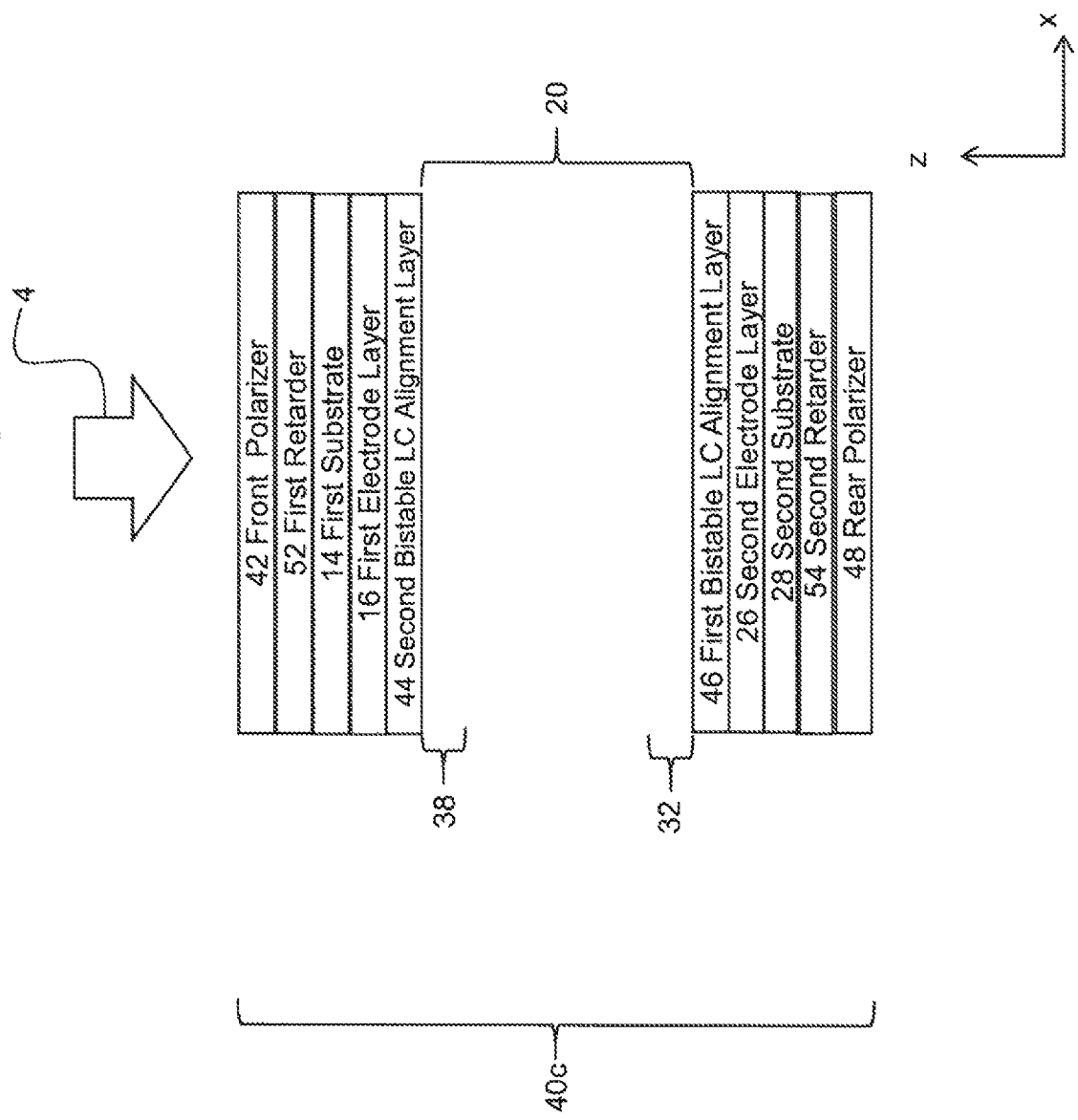
FIG. 10 is a schematic drawing depicting another exemplary LCD optical stack arrangement of a zenithal bistable display device in accordance with embodiments of the present invention.

FIG. 10 is a schematic drawing depicting another exemplary LCD optical stack arrangement of a zenithal bistable display device 40c in accordance with embodiments of the present invention, which is particularly suitable for the display system of FIG. 9. The configuration of FIG. 10 has common components relative to the configuration of FIGS. 5 and 6, and thus like components are identified with like reference numerals. With reference to FIG. 10, the zenithal bistable display device 40c further may include a first retarder layer 52 positioned between the front polarizer 42 and the first substrate 14. The first retarder layer 52 may be a negative C-plate retarder with a retardation of up to the same value as the retardation of the LC layer 20. Alternatively, the zenithal bistable display device 40c may include a second retarder layer 54 positioned between the rear polarizer 48 and the second substrate 28. The second retarder layer 54 also may be a negative C-plate retarder with a retardation of up to the same value as the retardation of the LC layer 20. In a further alternative, the zenithal bistable display device 40c may include both the first retarder layer 52 and the second retarder layer 54. If both the first retarder layer 52 and the second retarder layer 54 are negative c-plates and both the first and second retarder layers 52, 54 are present in the zenithal bistable display device 40c, then the sum of retardation provided by the first and second retarder layers 52, 54 may be up to the same value as the retardation of the LC layer 20.

In general, the presence of the first retarder layer 52 and/or the second retarder layer 54 is to cancel on-axis and/or off-axis retardation imparted by the zenithal bistable display device 40c in one of the four distinct optical states. In other words, the combination of the first retarder layer 52 and/or the second retarder layer 54 and the LC layer 20 cause no net polarization change for on-axis and off-axis light that traverses these optical components for one of the four distinct optical states. Consequently, the distinct optical state that, in combination with the first and/or second retarder layer 52, 54, imparts no net retardation to on-axis light and off-axis light enables conventional viewing of the image display 62 (i.e. the Zenithal Bistable Display Device 40a or 40b is effectively invisible allowing conventional viewing of the image display 62).

Figure 11:
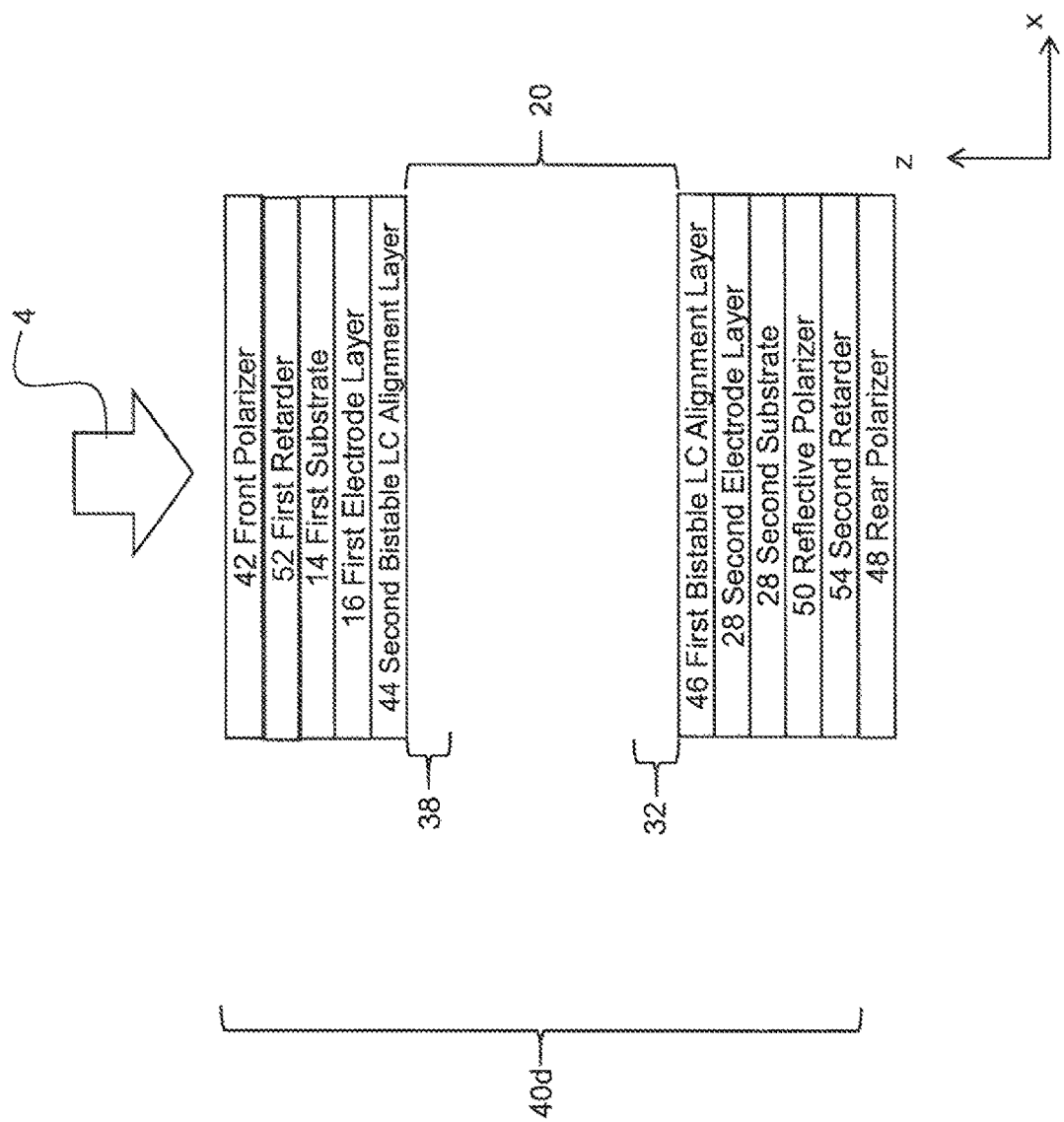
FIG. 11 is a schematic drawing depicting another exemplary LCD optical stack arrangement of a zenithal bistable display device in accordance with embodiments of the present invention.

FIG. 11 is a schematic drawing depicting another exemplary LCD optical stack arrangement of a zenithal bistable display device 40d in accordance with embodiments of the present invention. The configuration of FIG. 11 has common components relative to the configuration of FIG. 10, and thus like components are identified with like reference numerals. The configuration of FIG. 11 additionally incorporates the reflective polarizer 50 of previous embodiments, which in the embodiment of FIG. 11 is positioned between the second substrate 28 and the second retarder 54. As in previous embodiments, the presence of the reflective polarizer 50 enables the zenithal bistable display device 40d to operate in a reflective mode, by which ambient light may be reflected to be viewed by the viewer. The reflected light may be emitted to the viewer in accordance with any of the four distinct optical states as dictated by the alignment states induced by the two bistable alignment layers.

An aspect of the invention, therefore, is a display device that has four stable LC configurations, wherein each stable LC configuration corresponds to a distinct optical state of light emission that appears visually different to a viewer of the LCD. The display device includes an optical stack arrangement including from the viewing side: a front polarizer; a first electrode layer; a viewing side bistable liquid crystal (LC) alignment layer; an LC layer; a non-viewing side bistable LC alignment layer; a second electrode layer; and a rear polarizer. The non-viewing side bistable LC alignment layer and the viewing side bistable LC alignment layer induce alignment of LC molecules of the LC layer adjacent to respective surfaces of the non-viewing side bistable LC alignment layer and the viewing side bistable LC alignment layer. The non-viewing side bistable LC alignment layer is switchable between two stable LC alignment states and the viewing side bistable LC alignment layer is also switchable between two stable LC alignment states. A combination of structural parameters of the viewing side and non-viewing side bistable LC alignment layers and the front and rear polarizers renders the display device operable to achieve four stable distinct optical states, each stable distinct optical state having a different optical response when viewed from the viewing side of the display device. The display device may include one or more of the following features, either individually or in combination.

In an exemplary embodiment of the display device, the combination of structural parameters of the viewing side and non-viewing side bistable LC alignment layers and the front and rear polarizers satisfies the following structural relationships: the non-viewing side bistable LC alignment layer has a grating vector $\varphi_{G1}$ and the viewing side bistable LC alignment layer has a grating vector $\varphi_{G2}$, and an azimuthal orientation of the grating vectors $\varphi_{G1}$ and $\varphi_{G2}$ are different; a difference between the azimuthal orientation of the grating vectors $\varphi_{G1}$ and $\varphi_{G2}$ does not equal n*90° where n is an integer; the azimuthal orientation of the grating vector $\varphi_{G1}$ of the non-viewing side bistable and an azimuthal orientation of the rear polarizer transmission axis $\varphi_{P1}$ are different; the azimuthal orientation of the grating vector $\varphi_{G1}$ of the non-viewing side bistable alignment layer and an azimuthal orientation of the front polarizer transmission axis $\varphi_{P2}$ are different; the azimuthal orientation of the grating vector $\varphi_{G2}$ of the viewing side bistable alignment layer and the azimuthal orientation of the rear polarizer transmission axis $\varphi_{P1}$ are different; and the azimuthal orientation of the grating vector $\varphi_{G2}$ of the viewing side bistable alignment layer and the azimuthal orientation of the front polarizer transmission axis $\varphi_{P2}$ are different.

In an exemplary embodiment of the display device, the non-viewing side bistable LC alignment layer has a different switching threshold voltage from the viewing side bistable LC alignment layer to switch between the two stable LC alignment states.

In an exemplary embodiment of the display device, each of the non-viewing side bistable LC alignment layer and the viewing side bistable LC alignment layer is switchable between a first stable state that induces a planar alignment of the LC molecules and a second stable state that induces a vertical alignment of the LC molecules.

In an exemplary embodiment of the display device, the rear polarizer and the second electrode layer are disposed on opposite sides of a substrate, and the optical stack arrangement further includes a reflective polarizer positioned between the rear polarizer and the substrate.

In an exemplary embodiment of the display device, a transmission axis of the reflective polarizer is parallel to a transmission axis of the rear polarizer.

In an exemplary embodiment of the display device, the non-viewing side bistable LC alignment layer and the viewing side bistable LC alignment layer include grating structures to induce alignment of the LC molecules.

In an exemplary embodiment of the display device, the front polarizer and the first electrode layer are disposed on opposite sides of a first substrate, and the rear polarizer and the second electrode layer are disposed on opposite sides of a second substrate.

In an exemplary embodiment of the display device, the optical stack arrangement further includes a first optical retarder positioned between the front polarizer and the first substrate.

In an exemplary embodiment of the display device, the optical stack arrangement further includes a second optical retarder positioned between the rear polarizer and the second substrate.

In an exemplary embodiment of the display device, the four stable distinct optical states include a twisted LC state, a first hybrid aligned LC state, a second hybrid aligned LC state different from the first hybrid aligned LC state, and a vertically aligned LC state.

In an exemplary embodiment of the display device, the vertically aligned state is an optical state in which the display device is non-reflective and fully transmissive when viewed from the viewing side of the display device.

In an exemplary embodiment of the display device, each of the four stable distinct optical states has an optical response corresponding to a unique luminance and/or color.

In an exemplary embodiment of the display device, the display device is operable to achieve additional optical states each corresponding to a unique luminance and/or color, wherein the additional optical states are non-stable optical states.

In an exemplary embodiment of the display device, the display device is pixelated, and each pixel of the display device is selectively addressable to be switched to any of the four stable distinct optical states.

Another aspect of the invention is a display system including an optical stack arrangement from a viewing side including the display device according to any of the embodiments, and an image display that emits image light toward a viewing side of the display system. The display system may include one or more of the following features, either individually or in combination.

In an exemplary embodiment of the display system, the display device and the image display are adhered together by an optical adhesive.

In an exemplary embodiment of the display system, the image display has a higher resolution as compared to a resolution of the display device.

In an exemplary embodiment of the display system, the image display is one of a liquid crystal display, an organic light emitting diode display, a quantum dot light-emitting diode display, or a micro-light emitting diode display.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

INDUSTRIAL APPLICABILITY

Embodiments of the present invention are applicable to many display devices in which an enhanced display appearance and usage may be desirable, including portable electronic display devices. Examples of such devices include mobile phones including smartphones, personal digital assistants (PDAs), and tablet and laptop computers.

REFERENCE SIGNS LIST

2—LC molecule
4—viewing direction
6—generalized LCD device
10a/10b—conventional zenithal bistable display device
12—front polarizer
14—first substrate
16—first electrode layer
18—monostable LC alignment layer
20—LC layer
22—individual LC molecules
24—bistable alignment layer
26—second electrode layer
28—second substrate
30—rear polarizer
32—region adjacent first bistable LC alignment layer
36—second bistable LC alignment layer
38—region adjacent bistable LC alignment layer
40a-40d—embodiments of zenithal bistable display devices
42—front polarizer
44—second (viewing side) bistable LC alignment layer
46—first (non-viewing side) bistable LC alignment layer
48—real polarizer
50—reflective polarizer
52—first retarder layer
54—second retarder layer
60—exemplary display system
62—image display
64—optical adhesive

What is claimed is:

1. A display device comprising an optical stack arrangement including from the viewing side:
   a front polarizer;
   a first electrode layer;
   a viewing side bistable liquid crystal (LC) alignment layer;
   an LC layer;
   a non-viewing side bistable LC alignment layer;
   a second electrode layer; and
   a rear polarizer;
   wherein:
   the non-viewing side bistable LC alignment layer and the viewing side bistable LC alignment layer induce alignment of LC molecules of the LC layer adjacent to respective surfaces of the non-viewing side bistable LC alignment layer and the viewing side bistable LC alignment layer;
   the non-viewing side bistable LC alignment layer and the viewing side bistable LC alignment layer each is switchable between two stable LC alignment states;
   a combination of structural parameters of the viewing side and non-viewing side bistable LC alignment layers and the front and rear polarizers renders the display device operable to achieve four stable distinct optical states, each stable distinct optical state having a different optical response when viewed from the viewing side of the display device; and
   the combination of structural parameters of the viewing side and non-viewing side bistable LC alignment layers and the front and rear polarizers satisfies the following structural relationships:
   the non-viewing side bistable LC alignment layer has a grating vector $\varphi_{G1}$ and the viewing side bistable LC alignment layer has a grating vector $\varphi_{G2}$, and an azimuthal orientation of the grating vectors $\varphi_{G1}$ and $\varphi_{G2}$ are different; and
   a difference between the azimuthal orientation of the grating vectors $\varphi_{G1}$ and $\varphi_{G2}$ does not equal n*90° where n is an integer.

2. The display device of claim 1, wherein the combination of structural parameters of the viewing side and non-viewing side bistable LC alignment layers and the front and rear polarizers further satisfies the following structural relationships:
   the azimuthal orientation of the grating vector $\varphi_{G1}$ of the non-viewing side bistable and an azimuthal orientation of the rear polarizer transmission axis $\varphi_{P1}$ are different;
   the azimuthal orientation of the grating vector $\varphi_{G1}$ of the non-viewing side bistable alignment layer and an azimuthal orientation of the front polarizer transmission axis $\varphi_{P2}$ are different;
   the azimuthal orientation of the grating vector $\varphi_{G2}$ of the viewing side bistable alignment layer and the azimuthal orientation of the rear polarizer transmission axis $\varphi_{P1}$ are different; and
   the azimuthal orientation of the grating vector $\varphi_{G2}$ of the viewing side bistable alignment layer and the azimuthal orientation of the front polarizer transmission axis $\varphi_{P2}$ are different.

3. A display device comprising an optical stack arrangement including from the viewing side:
a front polarizer;
a first electrode layer;
a viewing side bistable liquid crystal (LC) alignment layer;
an LC layer;
a non-viewing side bistable LC alignment layer;
a second electrode layer; and
a rear polarizer;
wherein:
the non-viewing side bistable LC alignment layer and the viewing side bistable LC alignment layer induce alignment of LC molecules of the LC layer adjacent to respective surfaces of the non-viewing side bistable LC alignment layer and the viewing side bistable LC alignment layer;
the non-viewing side bistable LC alignment layer and the viewing side bistable LC alignment layer each is switchable between two stable LC alignment states;
a combination of structural parameters of the viewing side and non-viewing side bistable LC alignment layers and the front and rear polarizers renders the display device operable to achieve four stable distinct optical states, each stable distinct optical state having a different optical response when viewed from the viewing side of the display device; and
the non-viewing side bistable LC alignment layer has a different switching threshold voltage from the viewing side bistable LC alignment layer to switch between the two stable LC alignment states.

4. The display device of claim 1, wherein each of the non-viewing side bistable LC alignment layer and the viewing side bistable LC alignment layer is switchable between a first stable state that induces a planar alignment of the LC molecules and a second stable state that induces a vertical alignment of the LC molecules.

5. A display device comprising an optical stack arrangement including from the viewing side:
a front polarizer;
a first electrode layer;
a viewing side bistable liquid crystal (LC) alignment layer;
an LC layer;
a non-viewing side bistable LC alignment layer;
a second electrode layer; and
a rear polarizer;
wherein:
the non-viewing side bistable LC alignment layer and the viewing side bistable LC alignment layer induce alignment of LC molecules of the LC layer adjacent to respective surfaces of the non-viewing side bistable LC alignment layer and the viewing side bistable LC alignment layer;
the non-viewing side bistable LC alignment layer and the viewing side bistable LC alignment layer each is switchable between two stable LC alignment states;
a combination of structural parameters of the viewing side and non-viewing side bistable LC alignment layers and the front and rear polarizers renders the display device operable to achieve four stable distinct optical states, each stable distinct optical state having a different optical response when viewed from the viewing side of the display device; and
the rear polarizer and the second electrode layer are disposed on opposite sides of a substrate, and the optical stack arrangement further includes a reflective polarizer positioned between the rear polarizer and the substrate.

6. The display device of claim 5, wherein a transmission axis of the reflective polarizer is parallel to a transmission axis of the rear polarizer.

7. The display device of claim 1, wherein the non-viewing side bistable LC alignment layer and the viewing side bistable LC alignment layer include grating structures to induce alignment of the LC molecules.

8. The display device of claim 1, wherein the front polarizer and the first electrode layer are disposed on opposite sides of a first substrate, and the rear polarizer and the second electrode layer are disposed on opposite sides of a second substrate.

9. The display device of claim 8, wherein the optical stack arrangement further includes a first optical retarder positioned between the front polarizer and the first substrate.

10. The display device of claim 8, wherein the optical stack arrangement further includes a second optical retarder positioned between the rear polarizer and the second substrate.

11. The display device of claim 1, wherein the four stable distinct optical states include a twisted LC state, a first hybrid aligned LC state, a second hybrid aligned LC state different from the first hybrid aligned LC state, and a vertically aligned LC state.

12. The display device of claim 11, wherein the vertically aligned state is an optical state in which the display device is non-reflective and fully transmissive when viewed from the viewing side of the display device.

13. The display device of claim 11, wherein each of the four stable distinct optical states has an optical response corresponding to a unique luminance and/or color.

14. The display device of claim 13, wherein the display device is operable to achieve additional optical states each corresponding to a unique luminance and/or color, wherein the additional optical states are non-stable optical states.

15. The display device of claim 1, wherein the display device is pixelated, and each pixel of the display device is selectively addressable to be switched to any of the four stable distinct optical states.

16. A display system comprising an optical stack arrangement from a viewing side including:
the display device according to claim 1; and
an image display that emits image light toward a viewing side of the display system.

17. The display system of claim 16, wherein the display device and the image display are adhered together by an optical adhesive.

18. The display system of claim 16, wherein the image display has a higher resolution as compared to a resolution of the display device.

19. The display system of claim 16, wherein the image display is one of a liquid crystal display, an organic light emitting diode display, a quantum dot light-emitting diode display, or a micro-light emitting diode display.

20. A display system comprising an optical stack arrangement from a viewing side including:
the display device according to claim 3; and
an image display that emits image light toward a viewing side of the display system.

* * * * *